Jan. 19, 1932.           C. A. ADAMS           1,841,591
PLANT MULCH
Original Filed March 11, 1929

Inventor
Charles A. Adams,

Witness

By H. B. Willson &co
Attorneys

Patented Jan. 19, 1932

1,841,591

UNITED STATES PATENT OFFICE

CHARLES A. ADAMS, OF GREENSBURG, LOUISIANA

PLANT MULCH

Application filed March 11, 1929, Serial No. 346,217. Renewed April 14, 1931.

The invention aims to provide a new and improved type of plant mulch which may be easily and inexpensively manufactured, may be sold at small cost and yet will be unusually efficient. The improved mulch is intended to protect strawberries from grit and dirt by holding them off of the ground and permitting rain water to drain off at once. By so holding them, they are directly subjected to the rays from the sun and will develop and ripen very rapidly. Moreover, the mulch keeps down the vegetation and runners, will retain moisture in the ground where it is needed and will keep the ground at a more even temperature, thereby greatly enhancing the growth of the plants. The mulch may also be used in growing Irish potatoes and other tubers, and for various other crops, and in each instance, it will enhance the yield and reduce the cost of production. It makes an effective protection for early planted beans and the like and under it, they will come up and start to grow in an unusualy short time. The mulch is so constructed that it may be easily used at short notice to save any early vegetation and it can be also used as a wrapper for potato bunks and as a liner for the shipping containers used for young vines, vegetables, etc. Its construction is such that it can be easily treated during the course of manufacture with liquid or powder to prevent worms and insects from attacking the plants in connection with which it is used. As manufactured, the mulch is formed into neat rolls so that it can be readily fumigated, easily shipped, easily applied to the growing crops, and easily re-rolled, dried and kept for the next season's use.

The accompanying drawings illustrate the preferred form of construction and description is accomplished by reference thereto.

Figure 1:
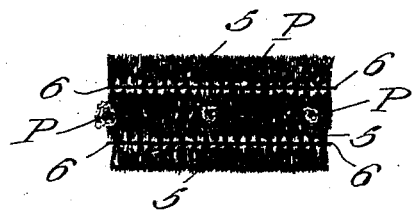
Fig. 1 is a more or less diagrammatic plan view showing two strips of the mulch in edge-to-edge relation at opposite sides of a row of plants.
Figure 2:
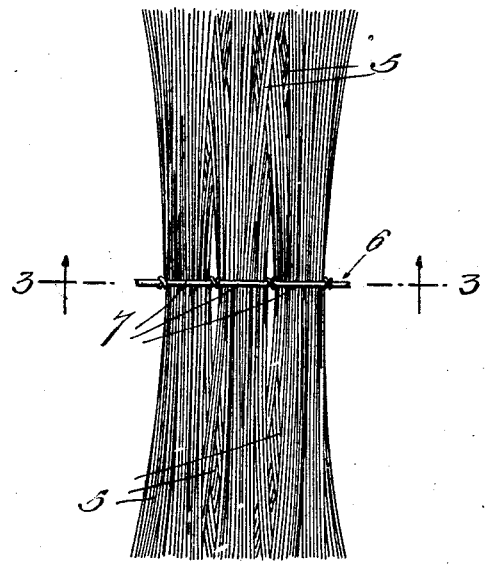
Fig. 2 is an enlarged fragmentary plan view of a portion of one of the strips.
Figure 3:
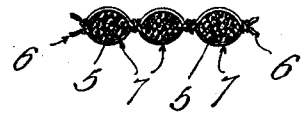
Fig. 3 is a detail longitudinal sectional view on line 3—3 of Fig. 2.

The mulch is in the form of an elongated flat strip to lie upon the earth, said strip embodying a myriad of transverse broom-sage straws or their equivalents 5 and a row 6 or more than one row if desired, of flexible tying means securing said straws in orderly relation. The tying means is preferably formed by a central longitudinal row of coarse stitching so that this tying means will be limp and any portion of its length will be free to turn with respect to adjacent portions. This stitching is provided with uniformly spaced loops or links 7, which loops or links tightly surround and thereby hold individual groups of the straws 5. The ends of these straws however are free so that the straws at the edge of one strip may intermesh with those at the edge of another strip as will be clear from Fig. 1, thereby completely covering the earth along and at opposite sides of a row of plants P to obtain the results hereinbefore enumerated. The construction disclosed also provides a mulch which is flexible both longitudinally and transversely so that it may readily adapt itself to irregularities upon the surface of the ground. The stitching or the like 6 at the central portion of the mulch constitutes virtually a limp spinal column from which the straws project in opposite directions, and it will be obvious that an equivalent construction could be provided in ways other than that herein disclosed. The construction illustrated is preferably followed, but within the scope of the invention as claimed, I comprehend numerous variations.

I claim:—

A mulch comprising a flat strip composed of a substantially central longitudinally disposed limp spinal column and a myriad of closely disposed transverse straws projecting in opposite directions from said limp spinal column and held in orderly relation thereby, said straws having free ends, any portion of the length of said limp spinal column being free to turn with respect to adjacent portions allowing any of said straws to tilt with respect to adjacent straws.

In testimony whereof I have hereunto affixed my signature.

CHARLES A. ADAMS.